United States Patent Office 2,788,260
Patented Apr. 9, 1957

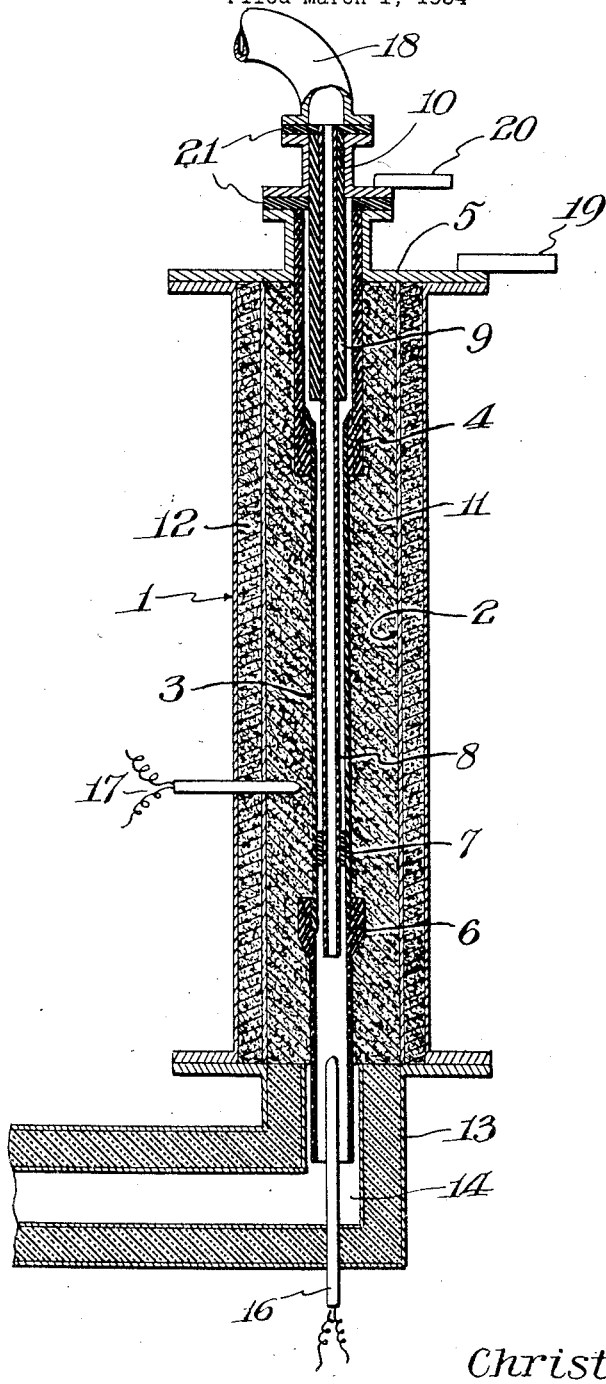

2,788,260

HEATING OXYGEN-CONTAMINATED HALOGEN-CONTAINING VAPORS

Christian E. Rick, Wilmington, Del., assignor to E. I. du Pont de Nemours and Company, Wilmington, Del., a corporation of Delaware Application March 1, 1954, Serial No. 413,071

8 Claims. (Cl. 23—202)

This invention relates to heating of oxygen contaminated halogen containing vapors such as titanium tetrachoride, and more particularly to a process of heating such vapors by means of carbon heating elements while minimizing the attack upon these heating elements by oxidizing impurities.

The elements of my process may be illustrated by describing one particular application in which it has been applied. In the preparation of titanium dioxide pigment material by the vapor phase oxidation of titanium tetrachloride with an oxygen containing gas, such as air, separate preheating of the reactants, prior to introduction into a reaction zone, is highly desirable. This step of heating the titanium tetrachloride to the required temperature has proven to be a difficult operation. The conventional type of heat exchange apparatus are not suitable because titanium tetrachloride is highly corrosive towards metals at elevated temperatures especially above about 400° C. Therefore, such heating must utilize corrosion-resistant heat-exchange equipment. Conventional type heat exchange equipment constructed mainly of the common refractory materials are not particularly suitable because most refractory materials are attacked to some extent by hot titanium chloride vapors. They therefore become unsuitable for such purpose due either to actual destruction of the refractory itself or because of the leaching out of impurities from the refractories by the titanium tetrachloride. Such impurities mixing with the titanium tetrachloride vapor cause subsequent contamination of the oxide reaction product and make it unsuitable for its intended use. The most desirable and useful refractory from the standpoint of corrosion is fused silica, but because of its glassy structure, it is very fragile and subject to progressive deterioration at elevated operating temperatures. This deterioration occurs and progresses through the apparatus resulting in the so-called devitrification of the glassy material and subsequent complete disintegration of the equipment. In all, these refractory heat exchangers are relatively inefficient, because of the inherent insulating properties of the materials and the difficulty of fabricating the needed complex and delicate shapes which commercial usage requires. With silica construction product gas temperature above 1000° C. are not commercially practicable.

Some of the construction difficulties of a heater may be avoided by practicing the method contemplated in U. S. Patent 2,512,341 which operates by mixing hot combustion gases with the titanium tetrachloride, but undesirable dilution of the reaction gas streams occurs. This undesirable dilution often results in requiring the use of processing equipment of increased size, and the hot gases must, for economic reasons, be substantially dry and free from hydrogen in order to prevent reaction of the resulting water or hydrogen with the titanium tetrachloride. Serious handicaps therefore present themselves in applying this method to heating titanium tetrachloride vapor.

Problems of a similar nature arise in the heating of other corrosive gases to high temperatures in many other chemical processes. Many vapor phase chemical processes require uncontaminated halogen-reactant gas of high purity, or a mixture of halogen-containing reactant gases, at relatively high temperatures, say, from 400 to 2000° C., prior to introduction into a reaction zone. For example, pure anhydrous silicon tetrachloride vapor may be required for oxidation by a vapor phase process to produce $SiO_2$, or SiO of a very high purity. Furthermore, halogenation reactions may require anhydrous HCl or other hydrogen halide gases at a temperature of 1000° C. or more, at which temperatures normal processes of heating HCl become unsatisfactory because of impurities introduced into the gas due to corrosion or because of high cost of equipment maintenance due to corrosiveness of the vapor or fragility of equipment. Also the corrosiveness of anhydrous free halogens and of halides of high temperatures is well known, and processes for heating them above 400 to 1000° C. are costly and/or purity of the heating gas is sacrificed.

Both of the common allotropic modifications of elemental carbon, carbon and graphite, are very applicable materials for construction of apparatus for heating these corrosive gases. Although elemental carbon has the required high melting point and is resistant to corrosion by the halide containing materials, structural forms such as tubes, rods, etc., are porous, and therefore are not well suited for the construction of heat exchange apparatus where contaminating heating gas exists on one side of a container and the halide gas on the other. Although this porosity of the material is a distinct drawback in the universal use of elemental carbon as a construction material in heat exchange equipment, these materials do have an additional property which permits their application in certain types of heat exchange equipment. Since both forms are electrical conductors, heat exchange apparatus may be designed using electrical heaters of carbon or graphite, rods, tubes, plates, spirals, etc. The containing vessel or conduit in which the vapors are heated may be constructed of carbon and then enclosed in a metal gas tight case. This metal case is separated from the heated zone materials by suitable heat insulation and is therefore held at a safe operating temperature.

A distinct drawback with the application of elemental carbon materials in a heat exchanger has been encountered in the heating of commercially produced titanium tetrachloride. In the commercial production of titanium tetrachloride the material contacts and absorbs oxidizing impurities from various sources. Among the oxygen contaminating means is the absorption of oxygen from dry air since small amounts of both oxygen and nitrogen are soluble in liquid titanium tetrachloride. Other contaminating influences result in oxygen combined with the titanium tetrachloride in the form of oxychloride materials which are somewhat soluble in the titanium tetrachloride. Such oxychloride materials may enter into the titanium tetrachloride by moisture in the air which contacts the material, from the use of water in various stages of the process, and from the hydrogen in the carbonaceous materials used in the chlorination step to prepare the titanium tetrachloride. This oxygen contamination of the titanium tetrachloride is especially detrimental because the oxidizing contaminant attacks the heated carbon surfaces of the heater. This attack is especially serious on the resistor used to heat the vapors because the product of the reaction is a gas, CO, which escapes and decreases the amount of carbon at the area of attack. Continued attack decreases the amount of current carrying material at the point of attack, causing this portion of the heater to become hotter. As the temperature of the portion under attack becomes greater, the attack becomes more rapid and a chain of events is set in motion which rapidly accelerates the attack to the destruction of the carbon heating element.

It is among the objects of this invention to provide novel and useful methods for heating oxygen contaminated anhydrous halogen containing vapor while maintaining the heated vapor in substantially uncontaminated state. A further object is to provide a novel process of heating an oxygen contaminated halogen containing vapor selected from the group consisting of free halogens of atomic number greater than nine, halides of hydrogen, and halides of metals and metalloid elements and mixtures thereof, from about 400° C. up to as high as 2000° C. A still further object is to provide a process for heating oxygen contaminated vaporous halides of group IV metals including halides of silicon to said temperatures in an elemental carbon heat exchange apparatus. A specific object is to provide a novel process for heating an oxygen contaminated vaporous anhydrous metal halide, such as titanium tetrachloride, either alone or in admixture with other vaporized halogen or halides and to temperatures within the range of from 400° C. to 2000° C. A further object is to provide a process for minimizing the oxidation of carbon components in an apparatus for heating oxygen contaminated titanium tetrachloride. Other objects and advantages of the invention will be apparent from the ensuing description.

These and other objects are accomplished by this invention relating to heating a vaporous oxygen contaminated halogen-containing reactant in which the halogen present has an atomic number greater than nine, to temperatures above 400° C. which comprises, heating with said vapors an amount of an organic halide to furnish a carbon content sufficient to react with the oxygen content in the said halide vapors, in which said heating is produced by passing said mixed vapors through an enclosed heating zone and in direct contact with an electrically heated resistor element composed of relatively dense, elemental allotropic forms of carbon selected from the group consisting of amorphous carbon, graphite, and mixtures thereof.

More specifically, the invention includes a process for minimizing the oxidation of carbon components in an apparatus for heating oxygen contaminated halogen-containing vapors which comprises heating with said vapors an amount of an organic halide to furnish a carbon content sufficient to react with the oxygen content in the said halide vapor.

In a more specific and preferred embodiment, the invention comprises as a step in the vapor phase oxidation of anhydrous titanium tetrachloride and mixtures thereof with vaporized anhydrous metal chlorides and anhydrous chlorine to produce titanium dioxide of superior pigment quality, the addition of an organic chloride in an effective amount to furnish carbon sufficient to react with the oxygen content in the vaporous titanium tetrachloride, before passage of said oxygen contaminated vaporous halide containing reactant over or through a plurality of electrically heated resistor units composed of elemental carbon selected from the allotropic forms of carbon-amorphous carbon, graphite, and mixtures thereof.

Referring to the accompanying drawing, there is shown a diagrammatic illustration in cross section of one form of an apparatus useful in carrying out this invention. The drawing illustrates a heat exchange apparatus wherein a graphite tube is electrically heated to furnish the energy required to heat titanium tetrachloride for preparation of titanium dioxide by oxidation. The apparatus consists of a corrosion resistant metal shell 1 in cylindrical form with end flanges. Concentrically held within the metal shell is a silica radiation shield 2. Axially spaced within the vessel are the heating and containing elements for the halogen containing gas, comprising an outer containing graphite tube 3 held by an upper socket 4 and lower member 6 both of graphite. The upper member is held by press fitting 4 into the flange 5 which is the upper closing means of the metal conduit. The fit between member 4 and the collar of flange 5 is sufficiently tight to maintain excellent electrical conductivity. This allows an electrical connection shown at 19 to be made to flange 5. Concentrically spaced within tube 3 is the main electrically heating resistor, a carbon or graphite tube 8 which is electrically connected to conduit 3 by graphite sleeve 7 which makes good electrical contact between tubes 3 and 8. The upper portion of tube 8 is fitted within the upper contact sleeve 9 which fits into member 10 comprising a doubly flanged tube, electrically insulated from flange 5 and supply pipe 18 by electrically nonconducting insulating gaskets 21. Member 10 has an electrical contact post 20 attached to it, serving as the other electric current connecting means. The lower member 6 of the carbon containing tube fits into the line to the oxidation reactor shown as conduit 14 which is mounted within an enclosing metal jacket 13 having the intervening space filled with thermal insulation such as carbon black. The spaces 11 and 12 between the heated conduit 3 and the enclosing metal case 1, are filled with thermal insulating material resistant to the corrosive halogen containing gases, carbon black and pure powdered silica respectively. The temperature of the heating tube and of the exit gases may be determined by measuring means such as thermocouples shown at 17 and 16 respectively, such measuring means preferably being enclosed within thermal and corrosion resistant cases. The halogen containing vapors to be heated enter by conduit 18, pass into the apparatus to be heated by the hot tubes 3 and 8, and then pass down through member 6 into the outlet conduit. In operation, the electrical heater elements 3 and 8 are energized by passing an electric current through the contacts 19 and 20. Some electrical energy is dissipated both in resistors 8 and 3 with the maximum temperature being achieved in the resistor 8 because of its smaller size and therefore higher resistance and larger amount of energy dissipation. The heated halogen containing vapor, for example titanium tetrachloride, leaving the apparatus through conduit 14 communicates with the source of use therefor such as an oxidation or cooxidation reactor unit for producing high-grade titanium dioxide pigments and in accordance with the methods described in U. S. Patents 2,488,439 or 2,559,638.

In such processes involving high temperatures of 800° C. and above, the heating elements are especially vulnerable to oxidation and corrosion resulting in so-called "hot spots" on the resistance elements. These hot spots lead to accelerated corrosion and rapid destruction. This type of corrosion is very apparent when the oxygen contaminated halogen containing gas such as titanium tetrachloride contaminated by quite small amounts of oxygen is heated by an apparatus similar to that illustrated herein.

Titanium tetrachloride, such as that commercially produced for the use in preparing titanium dioxide pigments by vapor phase oxidation, may easily contain 300 parts per million of oxygen resulting from the slight contact with the air such as occurs in the commercial production of this material. As previously discussed the oxygen occurs in two different types, (1) as a dissolved gas, and (2) as dissolved compounds. The amount of dissolved oxygen gas may be determined by bubbling carbon dioxide gas through a sample of the titanium tetrachloride, absorbing the gaseous products from this contacting operation in sodium hydroxide or potassium hydroxide, and allowing the unabsorbed gases to be trapped so that they may be measured for volume and analyzed for composition. By measurement of the total volume of gas and analyzing for oxygen content, such as by an Orsat gas analysis apparatus, the amount of dissolved oxygen in a titanium tetrachloride sample may be determined.

The amount of reacted oxygen in the titanium tetrachloride is thought to be nonvolatile in character if proper distillation techniques are utilized. A sample of the titanium tetrachloride is distilled through a column until the liquid is removed from the still pot and only solids remain. A maximum temperature of 150° C. is utilized and at the last of the distillation the still pot is swept with carbon dioxide. The solid product is removed and analyzed for titanium and chlorine, and with the assumption that the product is composed of $TiOCl_2$+titanium dioxide, or with the weight of the sample the oxygen content may be calculated. These methods may be utilized to determine the amounts of dissolved and combined oxygen as contaminants in the vapors to be heated. The purpose of the invention is now to add to the vapors before heating them to the desired temperature an effective amount of an organic compound which will react with the contaminating oxygen in the vapors during the heating operation and prevent the reaction between oxygen and carbon of the heating elements and/or enclosing structure. For the specific example being illustrated, the carbon compound may suitably be carbon tetrachloride and such a reaction may be illustrated as follows:

$$TiOCl_2 + CCl_4 \rightarrow TiCl_4 + CO + Cl_2$$

or for the use of tetrachloroethylene the reaction may proceed as follows:

$$2TiOCl_2 + C_2Cl_4 \rightarrow 2TiCl_4 + 2CO$$

The oxidation of the chlorocarbons by the free oxygen in the halogen containing vapor will proceed also;

$$2CCl_4 + O_2 \rightarrow 2CO + 4Cl_2 \text{ and } C_2Cl_4 + O_2 \rightarrow 2CO + 2Cl_2$$

It is satisfactory to provide an amount of an organic reactant such as an organic chloride to obtain a reacting carbon to oxygen atomic ratio of substantial unity.

For a clearer understanding of the invention, the following specific examples are given. These are merely illustrative and are not to be taken as limitations of the invention.

Example I

Titanium tetrachloride vapor at 145° C. and containing 200 parts per million (p. p. m.) total dissolved and reacted oxygen, as determined on a condensed sample by means herein described, was fed at a rate of 100 lbs. per hour under a pressure of about 5 lbs. into and through an electrically heated graphite resistor tube unit of the type shown in the drawing, completely enclosed in a tight nickel shell. Carbon tetrachloride vapor, at a rate of $\frac{2}{10}$ lb. per hour, was fed into the titanium tetrachloride vapor stream through a small pipe into the vapor feed line of the heater. The amount of carbon tetrachloride vapor required is calculated as follows: 100 lbs. of titanium tetrachloride with 200 p. p. m. of oxygen contains .02 lb. of oxygen;

$$\frac{.02}{32} = .00625 \text{ lb. mol of oxygen}$$

The equation $O_2 + 2CCl_4 \rightarrow 4Cl_2 + 2CO$ is used to determine the stoichiometric amounts, or $$\frac{2C}{O_2} = \frac{2 \times 12}{32} = .75$$

or for .02 lb. of $O_2 = .02 \times .75 = .15$ lb. of carbon.
Since $$\frac{CCl_4}{C} = \frac{154}{12} = 12.82$$

=the ratio of amount of carbon tetrachloride to the weight of carbon useable or the amount of carbon tetrachloride required to produce .015 carbon equals .015×12.82=.192 lb. CCl₄. This can then be rounded off to be .2 lb. CCl₄ per 100 lbs. of TiCl₄ each hour of operation. The mixed vapors were passed through the interior of the electrically heated resistor tubes in intimate contact with the resistor walls thereof which were maintained at a temperature of about 1900° C. by the flow of 60 cycle electric current. The temperature of the titanium tetrachloride was controlled by adjusting the voltage drop across the tube by means of a variable transformer. The hot titanium tetrachloride vapor discharges from the resistor unit at a temperature of about 1050° C. This heated titanium tetrachloride was conducted from the heater for direct use in the preparation of pigment grade titanium dioxide by the vapor phase oxidation of said titanium tetrachloride with an oxidizing gas by procedures described in U. S. Patent 2,488,439. After operation of this unit for a period of 8 hours the heater unit was swept free of titanium tetrachloride vapors by an inert gas and the heater unit removed for inspection. The resistor element was not visibly attacked, and in fact no change was observable except for a light dusty coating of carbon which resulted from the very slight excess of carbon tetrachloride which was used in this example. A similar experiment was conducted utilizing the above procedure without the introduction of the carbon tetrachloride into the inlet stream of the heater. After 8 hours operation of the heater unit and subsequent cooling, purging and removal of the resistor unit the following areas of corrosion were noted on the graphite heater element. Several pits and corroded areas were noticed in the upper portion of the resistor element, especially in the region where the titanium tetrachloride was being heated from above about 400° C. to the desired high temperature. Continued operation of the unit without the protective effect of the carbon tetrachloride would have resulted in complete destruction of the heater element in the pitted and corroded areas.

Example II

A vaporized mixture of anhydrous titanium tetrachloride containing 1% by weight of aluminum trichloride, at 300° C. was passed at a rate of 60 lbs. per hour into an electrically heated carbon resistor tube unit of the type shown in the drawing. This titanium tetrachloride contained 120 p. p. m. of oxygen as determined and discussed previously. Just prior to the entrance of the vapor into the electrically activated heater unit an effective amount of tetrachloroethylene vapor was mixed with the titanium tetrachloride vapor. The amount utilized was calculated as follows: 60 lbs. per hour of titanium tetrachloride with 120 p. p. m. of oxygen contains .0072 lb. of oxygen per hour or $$\frac{.0072}{32} = .000225 \text{ lb. mol of oxygen per hour}$$

Tetrachloroethylene ($C_2Cl_4$) reacts with oxygen as follows: $O_2 + C_2Cl_4 \rightarrow 2Cl_2 + 2CO$ or 1 molecule of $C_2Cl_4$ reacts with one molecule of $O_2$ therefore .000225×165.6 (molecular weight of $C_2Cl_4$)=.036 lb. $C_2Cl_4$ per hour required to react with the 120 p. p. m. oxygen in the halide vapor. A slight excess or equal to about .04 lb. per hour was added. This is equivalent to .04×454=18.16 grams per hour, or $C_2Cl_4$ with a density of $$1.6 = \frac{18}{1.6}$$

means 11.3 cc. to be added per hour. This was fed to a vaporizer in the liquid state by means of a container which fed a small glass dropping tip which allowed 20 drops per cc.; thereby, 230 drops per hour or about 4 drops per minute were furnished to the vaporizer. The liquid tetrachloroethylene was vaporized and the vapor carried by a tube to the inlet. The mixed gases were then passed through the interior of the electrical heated resistor tube, the latter being maintained throughout the operation at a temperature of about 1800° C. by 60 cycle current passing through the walls of the tubes. The resulting mixture of titanium tetrachloride and aluminum chloride vapor was heated to a temperature of 850° C. It was passed directly into an associated vapor phase co-oxidation unit for the production of high grade rutile titanium dioxide pigment by comixing it with an oxygen-containing gas in an oxidation reactor in accordance with the methods set forth in U. S. Patent 2,559,638. After an extended period of operation the heating apparatus was disconnected from the electrical source, the interior of the apparatus swept with an inert gas, and when cold was opened for inspection. The carbon resistor units were free of oxidation attack.

While described above as applied particularly to the heating of titanium tetrachloride with or without additive materials, the invention is applicable to the heating of anhydrous halogen-containing vapors generally and especially those selected from the group comprising free halogens having atomic number greater than nine, for example chlorine, bromine and iodine, halides of hydrogen, for example HCl, HBr, and HF, halides of metals and metalloid elements, such as NaBr, MgCl₂, AlCl₃, SiI₄, TiCl₄, FeCl₃, ZrBr₄, SiCl₄, and SnCl₂, and mixtures thereof to temperatures within the range of from about 400° C. to about 2000° C., when these materials are contaminated with free or combined oxygen.

A further advantage in the practice of the process of my invention is that it is unnecessary to provide auxiliary equipment to deoxygenate the vapor such as by passing it over a heated bed of finely divided or granulated activated carbon, that also requires auxiliary equipment which must be maintained and regenerated.

In my present process as herein described organic compounds deoxygenating the halogen containing vapor are preferably selected from the class comprised of halocarbons such as the chlorocarbons, for example $CCl_4$, $C_2Cl_4$, $C_2Cl_6$, and so forth, but many other organic compounds such as the halohydrocarbons such as $CHCl_3$ are applicable. Of the latter, the number of hydrogen atoms should be less than that of the chlorine or halogens so that on oxidation the hydrogen halide will be formed leaving carbon to be oxidized and some halogen to replace the oxygen in the combined oxygen type compound.

One of the factors to be considered in the selection of a particular organic compound as a deoxygenating agent is the temperature at which it will be oxidized and/or thermally cracked. If in the operation of an electrically heated carbon resistor unit such as shown in the appended drawing, it is found that the resistor is protected in the initial or cooler zone but that in another portion, say a hotter zone, some corrosion takes place, it will be advisable to apply an agent which has a higher decomposition or reaction temperature with the oxygen containing contaminant.

With the particular embodiment described in the examples, carbon tetrachloride is considered to be the preferred additive agent because of its favorably low cost and availability and the rapidity with which it will react with the combined and free oxygen in the titanium tetrachloride at a temperature above about 400° C. The use of the amounts shown in the examples represents a reaction where one atom of carbon in the additive agent reacts with one atom of oxygen and the resulting product is carbon monoxide. This reaction is considered to be the one applicable in the heating range encountered, especially in the presence of the carbon and/or graphite heater. The use of the additive agent produces only a very minor change in the gaseous composition because of the usually very low oxygen contamination of the halogen containing gas. Even with these small amounts of oxygen, severe corrosion especially of the pitting or necking-in variety will occur on the graphite resistor causing rapid destruction of the unit, if the oxygen is not removed from the halogen containing vapor.

I claim as my invention:

1. In a process for heating a vaporous oxygen-contaminated inorganic halogen-containing reagent to a temperature above 400° C. in an electrically heated heat exchanger provided with heated vapor contacting surfaces of carbon, the step comprising adding to said vapors, before passage through said heater, an organic halide selected from the group consisting of halocarbons and halohydrocarbons, the hydrogen atoms present in said halohydrocarbons being less than the halogen atoms present, and the amount of said organic halide being sufficient to react with the free and combined oxygen contaminants in said vapors and to minimize the oxidation of said carbon contacting surfaces.

2. A process for minimizing the oxidative corrosion of heated vapor-contacting carbon surfaces in an electrically heated heat exchanger for heating oxygen contaminated inorganic halogen containing vapors which comprises adding to said vapors before passage through said heater, a sufficient amount of an aliphatic, non-cyclic halohydrocarbon to react with the free and combined oxygen contaminants in said inorganic halogen containing vapors.

3. In the vapor phase process for the production of titanium dioxide by oxidation of heated vaporous titanium tetrachloride, the steps comprised of adding carbon tetrachloride to the titanium tetrachloride in an amount sufficient to react with the free and combined oxygen contaminants in the titanium tetrachloride and of passing the combined vapors through an electrically heated heat exchanger provided with heated carbon vapor-contacting surfaces to attain vapor temperatures in excess of 400° C. as required for the subsequent reaction to produce titanium dioxide.

4. In a process for heating a vaporous oxygen-contaminated halogen-containing reactant in which the halogen present has an atomic number greater than nine, to temperatures above 400° C., which comprises heating said vapors with an organic halide reactant selected from the group consisting of aliphatic, non-cyclic halocarbons and halohydrocarbons, with the latter containing less hydrogen atoms than halogen atoms, the amount of said organic halide being sufficient to react with the free and combined oxygen contaminants in said vapors, and producing the required heat by passing said vapors through an enclosed heating zone and in direct contact with an electrically heated resistor element composed of relatively dense, elemental allotropic forms of carbon selected from the group consisting of amorphous carbon, graphite, and mixtures thereof.

5. A method for heating an oxygen-contaminated, anhydrous halogen-containing vapor, the halogen component of which has an atomic number greater than 9, to temperatures ranging from about 400–2000° C. in an electrically-heated heat exchanger provided with heated carbon vapor-contacting surfaces while preventing corrosive attack of said carbon by said vapor, comprising prior to said heating incorporating in said vapor an amount of a halocarbon deoxygenating agent sufficient to react during the heating step with free and combined oxygen contaminants present in said vapor.

6. A method for heating an oxygen-contaminated, anhydrous chlorine-containing vapor to temperatures ranging from about 400–2000° C. in an electrically-heated heat exchanger provided with heated carbon vapor-contacting surfaces and preventing corrosive attack of carbon by said vapor during said heating, comprising incorporating in said vapor prior to said heating step an amount of a chlorocarbon deoxygenating agent sufficient to react with free and combined oxygen contaminants present in said vapor.

7. A method for heating an oxygen-contaminated, anhydrous titanium tetrachloride vapor to temperatures ranging from about 400–2000° C. within an electrically-heated heat exchanger provided with heat carbon vapor-contacting surfaces and preventing corrosive attack of said carbon by said vapor during said heating, which comprises incorporating in the vapor prior to said heating operation, an amount of a chlorocarbon deoxygenating agent sufficient to react during said heating step with free and combined oxygen contaminants present in said vapor.

8. In the vapor phase process for producing titanium dioxide by oxidation of heated vaporous titanium tetrachloride, the steps comprising adding tetrachloroethylene to the titanium tetrachloride in an amount sufficient to react with the free and combined oxygen contaminants in said titanium tetrachloride and passing the combined vapors through an electrically heated heat exchanger provided with heated carbon vapor-contacting surfaces to attain vapor temperatures in excess of 400° C. as required for the subsequent reaction to produce titanium dioxide.

References Cited in the file of this patent
UNITED STATES PATENTS

| | | |
|---|---|---|
| 2,184,887 | Muskat et al. | Dec. 26, 1939 |
| 2,340,610 | Muskat et al. | Feb. 1, 1944 |
| 2,512,341 | Krchma | June 20, 1950 |